United States Patent
Scotto

(10) Patent No.: US 8,124,289 B2
(45) Date of Patent: Feb. 28, 2012

(54) MULTISTAGE COMBUSTOR AND METHOD FOR STARTING A FUEL CELL SYSTEM

(75) Inventor: Mark Vincent Scotto, Uniontown, OH (US)

(73) Assignee: Rolls-Royce Fuel Cell Systems (US) Inc., North Canton, OH (US)

( * ) Notice: Subject to any disclaimer, the term of this patent is extended or adjusted under 35 U.S.C. 154(b) by 811 days.

(21) Appl. No.: 12/016,795

(22) Filed: Jan. 18, 2008

(65) Prior Publication Data

US 2008/0226955 A1 Sep. 18, 2008

Related U.S. Application Data

(60) Provisional application No. 60/881,789, filed on Jan. 22, 2007.

(51) Int. Cl.
*H01M 8/04* (2006.01)
*H01M 8/00* (2006.01)
*F23Q 9/00* (2006.01)
*F23D 14/62* (2006.01)

(52) U.S. Cl. ........ 429/429; 429/400; 429/441; 431/278; 431/354

(58) Field of Classification Search .................. None
See application file for complete search history.

(56) References Cited

U.S. PATENT DOCUMENTS

| | | | |
|---|---|---|---|
| 4,789,331 A | 12/1988 | Kawamura | |
| 4,818,219 A | 4/1989 | Widemann et al. | |
| 4,932,861 A | 6/1990 | Keller et al. | |
| 4,934,924 A | 6/1990 | Nakai | |
| 5,020,991 A | 6/1991 | Schaale et al. | |
| 5,066,219 A | 11/1991 | Anzawa et al. | |
| 5,088,918 A | 2/1992 | Schaale et al. | |
| 5,137,444 A | 8/1992 | Grebe et al. | |
| 5,346,391 A | 9/1994 | Fullemann et al. | |
| 5,391,075 A | 2/1995 | Robinson et al. | |
| 5,400,969 A | 3/1995 | Keene | |

(Continued)

FOREIGN PATENT DOCUMENTS

EP 1 198 020 A2 4/2002

(Continued)

OTHER PUBLICATIONS

Supplementary European Search Report, EP 08 72 7939, Sep. 6, 2011, Rolls-Royce Fuel Cell Systems Inc.

*Primary Examiner* — Emily Le
*Assistant Examiner* — Sarah A Slifka
(74) *Attorney, Agent, or Firm* — Krieg DeVault LLP

(57) ABSTRACT

A multistage combustor is configured for starting a fuel cell system, and includes a partial oxidation (POX) burner having an inlet for receiving a flow of a fuel/oxidant mixture, the POX burner being configured to partially oxidize fuel in the fuel/oxidant mixture to yield a partially oxidized gas; a first output coupled to the fuel cell system and configured to provide a first amount of the partially oxidized gas as first output gas to a first fuel cell system component; a second burner coupled to the POX burner, the second burner being configured to receive a second amount of the partially oxidized gas from the POX burner and to oxidize at least some remaining fuel to yield a second output gas different from the first output gas; and a second output coupled to a second fuel cell system component and configured to provide the second output gas to the second fuel cell system component.

18 Claims, 3 Drawing Sheets

U.S. PATENT DOCUMENTS

| | | | |
|---|---|---|---|
| 5,460,514 A | 10/1995 | Toyoshima et al. | |
| 5,474,442 A | 12/1995 | Gertsmann et al. | |
| 5,547,368 A | 8/1996 | Slavejkov et al. | |
| 5,558,515 A | 9/1996 | Althaus et al. | |
| 5,749,713 A | 5/1998 | Heylbroeck | |
| 5,759,024 A | 6/1998 | Robinson | |
| 5,928,805 A | 7/1999 | Singh et al. | |
| 6,033,794 A | 3/2000 | George et al. | |
| 6,085,738 A | 7/2000 | Robinson et al. | |
| 6,132,203 A | 10/2000 | Masin | |
| 6,217,315 B1 | 4/2001 | Mifune et al. | |
| 6,532,727 B1 | 3/2003 | Lundgren | |
| 6,579,090 B1 | 6/2003 | Taubitz et al. | |
| 6,585,509 B2 | 7/2003 | Young et al. | |
| 6,612,830 B2 | 9/2003 | Berry et al. | |
| 6,645,650 B2 | 11/2003 | Meyer et al. | |
| 6,669,463 B2 | 12/2003 | Beutel et al. | |
| 6,679,061 B2 | 1/2004 | Steinbach et al. | |
| 6,708,481 B2 | 3/2004 | Kamen et al. | |
| 6,746,235 B1 | 6/2004 | Aszenbrenner et al. | |
| 6,805,553 B2 | 10/2004 | Hermann et al. | |
| 6,875,007 B2 | 4/2005 | Pettit | |
| 6,905,327 B2 | 6/2005 | Tachihara et al. | |
| 6,916,172 B2 | 7/2005 | Steiner | |
| 6,971,235 B2 | 12/2005 | Langenfeld et al. | |
| 6,981,865 B2 | 1/2006 | Kobayashi | |
| 6,986,797 B1 | 1/2006 | Clawson et al. | |
| 2002/0110711 A1 | 8/2002 | Boneberg et al. | |
| 2002/0146609 A1 | 10/2002 | Breault | |
| 2003/0031966 A1 | 2/2003 | Berry et al. | |
| 2004/0126724 A1 | 7/2004 | Yamaguchi et al. | |
| 2005/0019623 A1 | 1/2005 | Shoji et al. | |
| 2005/0079462 A1 | 4/2005 | Sennoun et al. | |
| 2005/0089732 A1 | 4/2005 | Aoyama et al. | |
| 2005/0091922 A1 | 5/2005 | Goebel et al. | |
| 2006/0064931 A1 | 3/2006 | Gary et al. | |
| 2006/0251940 A1 | 11/2006 | Bandhauer et al. | |
| 2007/0037022 A1 | 2/2007 | Kim et al. | |

FOREIGN PATENT DOCUMENTS

| | | |
|---|---|---|
| EP | 1 703 578 A1 | 9/2006 |
| WO | WO 02/23659 A1 | 3/2002 |

MULTISTAGE COMBUSTOR AND METHOD FOR STARTING A FUEL CELL SYSTEM

CROSS-REFERENCE TO RELATED APPLICATIONS

This is a non-provisional application based upon U.S. provisional patent application Ser. No. 60/881,789, entitled "Partial Oxidation Premix Burner," filed Jan. 22, 2007, which is incorporated by reference herein.

GOVERNMENT RIGHTS IN PATENT

The invention described herein was made with the proceeds from U.S. government contract no. DE-FC36-04GO14318. The U.S. government may have certain rights in this patent.

MICROFICHE APPENDIX

None.

BACKGROUND OF THE INVENTION

1. Field of the Invention

The present invention relates to fuel cell systems, and, more particularly, to an apparatus and method for starting a fuel cell system.

2. Description of the Related Art

Fuel cell systems, such as fuel cell based power plants and mobile fuel cell based power generation equipment, generate electrical power via electrochemical reactions, and are coming into greater use because the exhaust byproducts are typically cleaner than traditional power plants, and because fuel cells may generate electricity more efficiently than traditional power plants. Fuel cell systems often employ stacks of individual fuel cells, each fuel cell typically including an anode, a cathode, and an electrolyte positioned between the anode and the cathode. The electrical load is coupled to the anode and the cathode. The anode and cathode are electrically conductive and permeable to the requisite gasses, such as oxygen. In a solid oxide fuel cell (SOFC), the electrolyte is configured to pass oxygen ions, and has little or no electrical conductivity, so as to prevent the passage of free electrons from the cathode to the anode. In order for the electrochemical reactions to take place efficiently, some fuel cells are operated at elevated temperatures, e.g., with anode, cathode and electrolyte temperatures in the vicinity of 700° C. to 1000° C. or greater for an SOFC.

During normal operation, a synthesis gas is supplied to the anode, and an oxidant, such as air, is supplied to the cathode. Some fuel cell systems include an internal reformer that catalytically reforms the fuel into a synthesis gas by use of an oxidant. The fuel may be a conventional fuel, such as gasoline, diesel fuel, natural gas, etc. The synthesis gas typically includes hydrogen ($H_2$), which is a gas frequently used in fuel cells of many types. The synthesis gas may contain other gases suitable as a fuel, such as carbon monoxide, which serves as a reactant for some fuel cell types, e.g., SOFC fuel cells, although carbon monoxide may be detrimental to other fuel cell types, such as PEM (proton exchange membrane) fuel cells. In addition, the synthesis gas typically includes other reformer byproducts, such as water vapor and other gases, e.g., nitrogen and carbon dioxide ($CO_2$), as well as trace amounts of hydrocarbon slip, such as methane.

In any event, the synthesis gas is oxidized in an electrochemical reaction in the anode with oxygen ions received from the cathode via diffusion through the electrolyte. The reaction creates water vapor, and electricity in the form of free electrons in the anode that are used to power the electrical load. The oxygen ions are created via an oxygen reduction of the cathode oxidant using the electrons returning from the electrical load into the cathode.

Once the fuel cell is started, internal processes maintain the required temperature for operation. However, in order to start the fuel cell, the primary fuel cell system components must be heated, and some fuel cell system components must be protected from damage during the startup. For example, the anode may be subject to oxidative damage in the presence of oxygen at temperatures below the normal operating temperature in the absence of the synthesis gas. Also, the reformer may require a specific chemistry in addition to heat, in order to start its catalytic reactions that generate the synthesis gas. Further, the startup of the fuel cell system should be accomplished in a safe manner, e.g., so as to prevent an explosive mixture from forming during the starting process.

What is needed in the art is an apparatus and method for starting a fuel cell system.

SUMMARY OF THE INVENTION

The present invention provides an apparatus and method for starting a fuel cell system.

It will be noted that the terms "first" and "second," etc., preceding an element name, e.g., first output, second output, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

The invention, in one form thereof, is directed to a multistage combustor configured for starting a fuel cell system that includes a first component and a second component. The multistage combustor includes a partial oxidation (POX) burner having an inlet for receiving a flow of a fuel/oxidant mixture, the POX burner being configured to partially oxidize a fuel in the fuel/oxidant mixture to yield a partially oxidized gas; a first output coupled to the fuel cell system and configured to provide a first amount of the partially oxidized gas as a first output gas from the multistage combustor to the first component; a second burner coupled to the POX burner, the second burner being configured to receive a second amount of the partially oxidized gas from the POX burner and to oxidize at least some of a remaining fuel in the second amount of the partially oxidized gas to yield a second output gas from the multistage combustor different from the first output gas; and a second output coupled to the second fuel cell system component and configured to provide the second output gas to the second fuel cell system component.

The invention, in another form thereof, is directed to a fuel cell system. The fuel cell system includes an anode; a cathode fluidly coupled to a source of a normal cathode oxidant, the cathode being permeable to oxygen ions received from the normal cathode oxidant; an electrolyte in communication with the anode and the cathode, the electrolyte being configured to supply the oxygen ions from the cathode to the anode; a reformer fluidly coupled to the anode, the reformer being configured to receive a normal operating fuel and a normal reformer oxidant, and to generate a synthesis gas from the normal operating fuel and the normal reformer oxidant for use by the anode; a recuperator configured to recapture waste heat for use in the fuel cell system; and a multistage combustor configured for starting the fuel cell system. The multistage combustor includes: a partial oxidation (POX) burner having a first inlet for receiving a flow of a starting fuel/oxidant mixture, the POX burner being configured to partially oxidize a starting fuel in the starting fuel/oxidant mixture to yield a partially oxidized gas; a first output coupled to the fuel cell system and configured to provide a first amount of the partially oxidized gas as a first output gas from the multistage combustor to the reformer, the first output gas being configured to start a reaction in the reformer; a second burner coupled to the POX burner, the second burner being configured to receive a second amount of the partially oxidized gas from the POX burner and to oxidize at least some of a remaining starting fuel in the second amount of the partially oxidized gas to yield a second output gas from the multistage combustor different from the first output gas; and a second output coupled to the recuperator and configured to provide the second output gas to the recuperator The invention, in yet another form thereof, is directed to a combustor for starting a fuel cell system. The combustor includes a premix partial oxidation (POX) burner, the premix POX burner having a housing, a reaction zone defined in the housing; an igniter; and an inlet configured to receive a flow of a fuel/oxidant mixture into the reaction zone, the premix POX burner being configured to ignite and partially oxidize a fuel in the fuel/oxidant mixture in the reaction zone to yield a partially oxidized gas; a first output configured to discharge a first amount of the partially oxidized gas to the fuel cell system from the premix POX burner as a first output gas of the combustor; and a second output configured to discharge a second amount of the partially oxidized gas from the premix POX burner.

The invention, in still another form thereof, is directed to a method for starting a fuel cell system. The method includes partially oxidizing a starting fuel in a starting fuel/oxidant mixture in a first combustion process to yield a partially oxidized gas; extracting a first amount of the partially oxidized gas as a first starting gas product; performing at least one fuel cell system starting task using the first starting gas product; oxidizing at least some of a remaining starting fuel in a second amount of the partially oxidized gas in a second combustion process to yield a second starting gas product; and heating at least a portion of the fuel cell system using the second starting gas product.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting the scope of the invention in any manner.

DETAILED DESCRIPTION OF THE INVENTION

Figure 1:
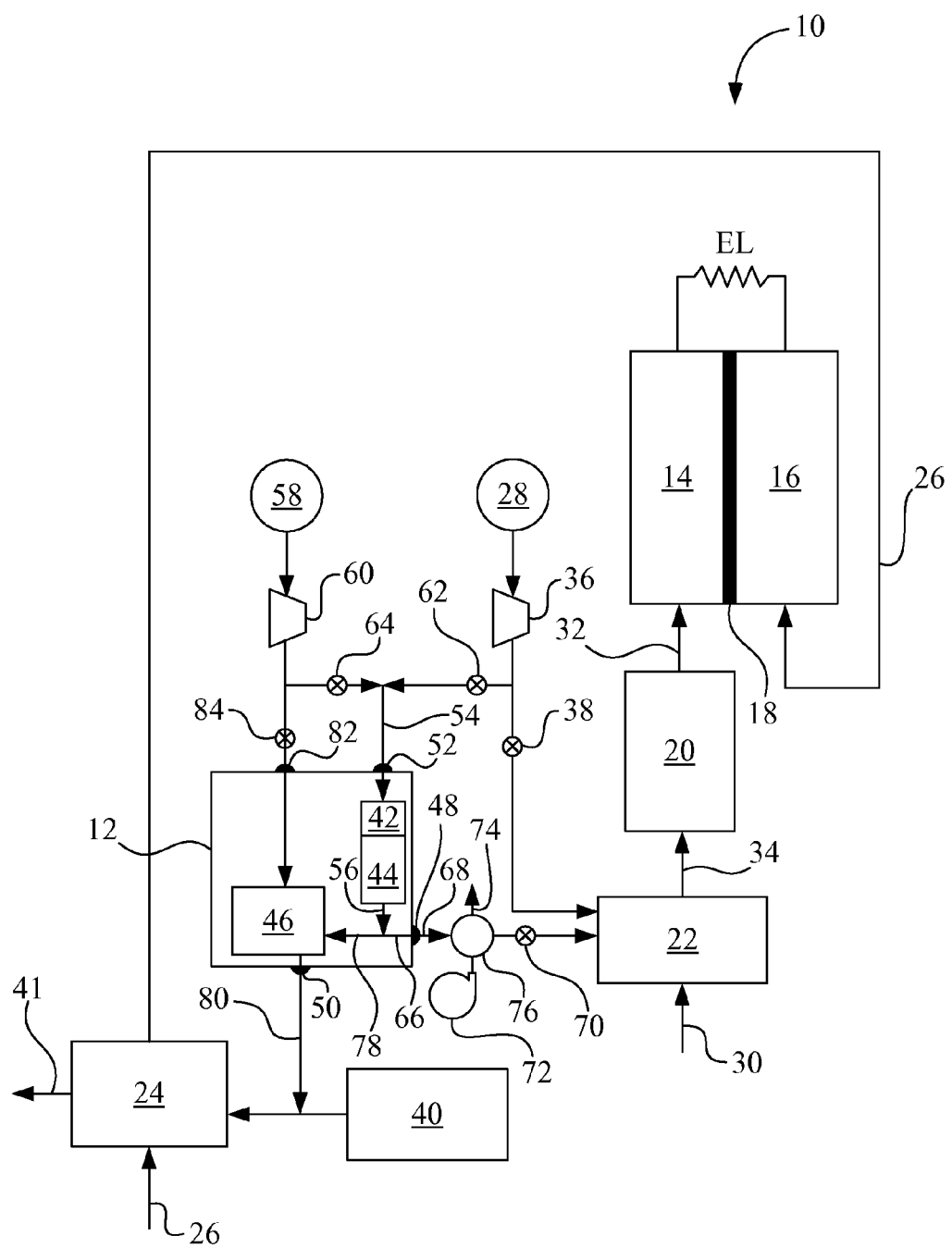
FIG. 1 is a schematic depiction of a fuel cell system and a multistage combustor configured for starting the fuel cell system in accordance with one embodiment of the present invention.

Referring now to the drawings and particularly to FIG. 1, there is schematically shown a fuel cell system 10 and a multistage combustor 12 configured for starting fuel cell system 10 in accordance with one embodiment of the present invention. Fuel cell system 10 may be configured to generate electrical power for an electrical load EL, such as a fixed or mobile end user of electrical power. In the present embodiment, fuel cell system 10 employs solid oxide fuel cells (SOFC), although it will be understood that other types of fuel cells may be employed without departing from the scope of the present invention, for example, alkali fuel cells, molten carbonate fuel cells (MCFC), phosphoric acid fuel cells (PAFC), and proton exchange membrane (PEM) fuel cells.

Fuel cell system 10 may include an anode 14, a cathode 16, an electrolyte 18, a reformer 20, a vaporizer/mixer 22, and a recuperator 24. In the present embodiment, anode 14 and cathode 16 may be electrically coupled to electrical load EL, and electrolyte 18 may be in communication with both anode 14 and cathode 16. As set forth below, reformer 20 may be coupled to anode 14, vaporizer/mixer 22 may be coupled to reformer 20, and recuperator 24 may be coupled to cathode 16.

Fuel cell system 10 is described with respect to anode 14, cathode 16 and electrolyte 18 for purposes of illustration. Nonetheless, it will be understood that in actual practice, fuel cell system 10 may employ one or more stacks of individual interconnected fuel cell units, each unit having an anode, cathode and electrolyte.

Anode 14 may support electrochemical reactions that generate electricity, wherein a synthesis gas may be oxidized in the anode with oxygen ions received from cathode 16 via diffusion through electrolyte 18. The reactions may create water vapor and electricity in the form of free electrons in anode 14, which may be used to power electrical load EL. The oxygen ions may be created via an oxygen reduction of a cathode 16 oxidant using the electrons returning from electrical load EL into the cathode.

Cathode 16 may be fluidly coupled to a source of a normal cathode oxidant 26, such as the oxygen in atmospheric air. As used herein, the term, "fluidly coupled," designates a coupling between the referenced components such that fluids, e.g., liquids and/or gases, may pass from one component to the other in the indicated direction of process flow, e.g., as indicated by the arrowheads illustrated in FIG. 1. Normal cathode oxidant 26 is defined as the oxidant that is supplied to cathode 16 as part of the regular process employed by fuel cell system 10 in generating electrical power to operate load EL. Cathode 16 may be permeable to oxygen ions received from the cathode oxidant 26.

Electrolyte 18 may be in communication with anode 14 and cathode 16. Electrolyte 18 may be configured to pass oxygen ions from cathode 16 to anode 14, and may have little or no electrical conductivity, so as to prevent the passage of free electrons from cathode 16 to anode 14.

Reformer 20 may be fluidly coupled to anode 14, and may be configured to receive a normal operating fuel 28 and a normal reformer oxidant 30, and to generate a synthesis gas 32 from operating fuel 28 and reformer oxidant 30 for provision to anode 14, e.g., for performing the electrochemical reactions at anode 14 that generate electricity. Normal operating fuel 28 and normal oxidant 30 are defined as the fuel and oxidant, respectively, which are supplied to reformer 20 in order to generate synthesis gas 32 as part of the regular process employed by fuel cell system 10 in generating electrical power to operate load EL. In the present embodiment, normal oxidant 30 may be the oxygen in atmospheric air.

Synthesis gas, also known as syngas, may be a gas that is synthesized from a hydrocarbon fuel, such as diesel fuel or other liquid or gaseous hydrocarbon fuels, in order to yield hydrogen ($H_2$). Synthesis gas may also include carbon monoxide (CO), and byproducts, such as water vapor, other gases such as nitrogen and carbon dioxide ($CO_2$), and trace amounts of hydrocarbon slip, such as methane. Synthesis gas may be employed in the electrochemical reactions that generate electricity in a fuel cell, such as SOFC fuel cells and other fuel cells.

In the present embodiment, reformer 20 may be a catalytic partial oxidation (CPOX) reformer that employs exothermic catalytic reactions to produce synthesis gas 32 from fuel 28 and oxidant 30. Reformer 20 may combine the fuel 28 with about 35% of the stoichiometric combustion $O_2$ (which is provided by oxidant 30) to yield an operating temperature suitable for the catalyst (not shown) that may be employed as part of reformer 20.

Vaporizer/mixer 22 may be fluidly coupled to reformer 20, and may be configured to mix fuel 28 and oxidant 30 and to vaporize the fuel 28 in the mixture for delivery to reformer 20 as a mixed fuel vapor/oxidant 34. Thus, in the present embodiment, operating fuel 28 and reformer oxidant 30 may be received by reformer 20 in the form of mixed fuel vapor/oxidant 34. Fuel 28 may be pressurized via a pump 36 to induce a flow of fuel 28 into both vaporizer/mixer 22 and combustor 12. A valve 38 may be employed in conjunction with the speed of pump 36 to regulate the pressure of fuel 28 that is supplied to vaporizer/mixer 22.

Recuperator 24 may be fluidly coupled to cathode 16, and may be configured to recapture waste heat from an exhaust 40 of fuel cell system 10, which may include gases, vapors, and/or liquids discharged from anode 14, cathode 16, and/or other components of fuel cell system 10 not referenced or illustrated herein. Recuperator 24 may also employ connections to other fuel cell system 10 components (not shown), to recapture heat that may otherwise be wasted from those components, and, in the exemplary embodiment set forth herein, may recuperate heat from combustor 12. In the present embodiment, recuperator 24 may be in the form of a heat exchanger that indirectly provides heat to cathode oxidant 26 that is recaptured from exhaust 40 and second output gas 80, which are discharged as a combined exhaust flow 41 from recuperator 24. However, in other embodiments, recuperator 24 make take the form of other devices configured to recapture heat, indirectly, as with a heat exchanger, or directly, as with a jet pump.

Combustor 12 may include a preheater 42, a partial oxidation (POX) burner 44, a second burner 46, a first output 48 to fuel cell system 10, and a second output 50 to fuel cell system 10. Combustor 12 may be referred to as a multistage combustor because it has more than one combustion stage, i.e., POX burner 44 and burner 46 arranged in serial fashion, as set forth below. It will be understood that additional combustion stages may be added to combustor 12 without departing from the scope of the present invention. For example, additional combustion stages may be provided upstream of POX burner 44, between POX burner 44 and burner 46, and/or downstream of burner 46.

POX burner 44 may have an inlet 52 for receiving a flow of a starting fuel/oxidant mixture 54. Starting fuel/oxidant mixture 54 includes a starting fuel 28 and a starting oxidant. POX burner 44 may be configured to partially oxidize the starting fuel 28 in starting fuel/oxidant mixture 54 to yield a partially oxidized gas 56.

The term, "starting fuel," pertains to the fuel that is used by combustor 12 to start fuel cell system 10. In the present embodiment, the starting fuel may advantageously be the same fuel that is used by fuel cell system 10 during regular fuel cell system 10 operations, i.e., its regular electrical power generating operations for supplying power to load EL. Hence, in the present embodiment, the fuel supplied to POX burner 44 may be the same normal fuel 28 employed by reformer 20 during regular fuel cell system operations, and is thus identified in the present embodiment as fuel 28. However, it will be understood that other fuels may be employed as a starting fuel without departing from the scope of the present invention.

The oxidant employed in starting fuel/oxidant mixture 54 is a starting oxidant 58, which may include the oxygen in atmospheric air, the same oxidant that may be used in cathode 16. However, it will be understood that other oxidants may be employed as starting oxidant 58 without departing from the scope of the present invention. For example, starting oxidant 58 may include a recycled gas in addition to or in place of air, without departing from the scope of the present invention. Starting oxidant 58 may also be the same as normal reformer oxidant 30, that is, the oxidant used by reformer 20 during the regular operations of fuel cell system 10 in generating electrical power to operate load EL. In addition, oxidant 58 may alternatively be oxygen-depleted air, i.e., air that is partially depleted of oxygen, so as to permit the production of a more weakly flammable partially oxidized gas 56 than if a regular atmospheric air is used.

In the present embodiment, starting oxidant 58 may be supplied to combustor 12 via a blower 60. The oxidant flow may be regulated using the speed of blower 60, and the oxidant/fuel ratio of starting fuel/oxidant mixture 54 may be also controlled by a valve 64, which may regulate the amount of starting oxidant 58, respectively, that is delivered to combustor 12. A valve 62 may control the flow of fuel 28 that is delivered to combustor 12.

The oxidant/fuel ratio in the stream of fuel/oxidant mixture 54 flowing to combustor 12 may be controlled based on the temperature of partially oxidized gas 56. For example, if the operational temperature is above a desired set point, the speed of blower 60 may be reduced to lower the temperature to a value at or below the desired set point.

In the present embodiment, starting fuel/oxidant mixture 54 may be approximately 55% to 75% of stoichiometric, although other substoichiometric mixtures may be employed, depending upon the particular startup tasks for which partially oxidized gas 56 is intended, and depending upon the operating temperature limits of the fuel cell system 10 components and combustor 12 components.

Preheater 42 may be configured to preheat fuel/oxidant mixture 54 using heat released during the partial oxidation of fuel 28 in POX burner 44 to vaporize the fuel 28 in fuel/oxidant mixture 54. In the present embodiment POX burner 44 may be a premix burner, and may be configured to perform flame burning of fuel/oxidant mixture 54.

First output 48 of combustor 12 may be coupled to fuel cell system 10, and may be configured to provide a first amount 66 of partially oxidized gas 56 as a first output gas 68 from combustor 12 to reformer 20. The first amount 66 of partially oxidized gas 56, which is first output gas 68, may be configured in both chemistry and quantity to start a reaction in reformer 20, i.e., to start the normal catalytic reactions that take place in reformer 20 during normal fuel cell system 10 operation, as well as to provide a reducing gas as a blanket gas to protect anode 14 from oxidation during startup. Output gas 68 may also be configured as a safe gas, which is a gas that is nonflammable or weakly flammable, so as to minimize the likelihood of a fire or explosion in or near fuel cell system 10 during the startup of fuel cell system 10. In one embodiment, a more highly flammable output gas 68 may be converted to a relatively safe, more weakly flammable gas by through additional controlled oxidation using reformer 20.

Output 48 may provide output gas 68 to anode 14 via vaporizer/mixer 22 and reformer 20. In order to regulate the amount of output gas 68 provided to vaporizer/mixer 22, reformer 20 and anode 14, fuel cell system 10 may include a valve 70, which may be used to determine the first amount 66 that flows into fuel cell system 10. In addition, fuel cell system 10 may include a blower 72 that may blow a coolant 74, such as air, through a heat exchanger 76 to cool output gas 68 sufficiently to prevent damage to valve 70 and other components of fuel cell system 10. Alternatively, it is contemplated that the quantity of output gas 68 that may be diverted to vaporizer/mixer 22, reformer 20 and anode 14 may be controlled through the operation of other valves and/or blowers (not shown) that are part of fuel cell system 10.

Burner 46 may be coupled to POX burner 44, and may be configured to receive a second amount 78 of partially oxidized gas 56 from POX burner 44, and to oxidize at least some of the remaining starting fuel in the second amount 78 of partially oxidized gas 56, i.e., the remaining amount of starting fuel that was not oxidized in POX burner 44, to yield a second output gas 80 from multistage combustor 12. Second output gas 80 is different than first output gas 68, due to being further oxidized in burner 46. In the present embodiment, burner 46 may be a catalytic burner that performs the oxidation using a catalytic combustion process, although it will be understood that a non-catalytic burner, such as a flame burner, may be employed without departing from the scope of the present invention. For example, a scaled version of POX burner 44 may be employed in other embodiments as burner 46.

Second output 50 may be coupled to recuperator 24 of fuel cell system 10, and may be configured to provide second output gas 80 to components of fuel cell system 10 that may utilize such gas for startup operations. In the present embodiment, output gas 80 may be supplied to recuperator 24, which may be configured to extract heat from output gas 80 for subsequent use in fuel cell system 10, e.g., to preheat cathode 16 during startup of fuel cell system 10. Alternatively, it is considered that output gas 80 may be supplied to other fuel cell system 10 components in addition to or in place of recuperator 24. Second burner 46 may be configured to completely oxidize the second amount 78 of partially oxidized gas 56 in order to yield output gas 80. Burner 46 may completely oxidize the remaining fuel in order to minimize pollutant emissions and to provide the maximum amount of heat, although it will be understood that in other embodiments, the output of burner 46 may not be completely oxidized, so as to be provided to recuperator 24 and/or other fuel cell system components for which a partially oxidized gas is desired, without departing from the scope of the present invention.

In order to accommodate the complete oxidation of the fuel 28 remaining in the second amount 78 of partially oxidized gas 56, combustor 12 may include a second inlet 82 coupled to burner 46, which may be configured to supply a secondary oxidant 58 flow to burner 46 sufficient for complete oxidation of the remaining fuel 28. The secondary oxidant 58 flow to burner 46 may be regulated by valve 84 and the rotational speed of blower 60. In the present embodiment, secondary oxidant 58 flow to burner 46 may be controlled to achieve a burnout catalyst temperature of 800° C. to 900° C., although it will be understood that other burnout temperatures may be employed.

Second output gas 80 flow may control the heat-up rate of fuel cell system 10. Second output gas 80 flow may be controlled by the delivery rate of fuel 28. The process temperature of second output gas 80 at second output 50 may control the oxidant to fuel ratio at burner 46 in a similar manner to POX burner 44.

In an experimental version of an embodiment of the present invention that was used for testing, a premix burner included a cylindrical container with internal insulation. A coil tube was wrapped around the container and penetrated the container and the insulation. A hot surface igniter was attached to the inside of the container at one end and extended a predetermined distance toward the opposite end of the container. The end of the container opposite the hot surface igniter was provided with an exit port.

The coil tube delivered a starting fuel/air mixture into the container. The coil tube preferably entered the container at an angle that promoted swirling of the fuel air mixture in the container. The length of the coil tube was designed to preheat the fuel/air mixture to a temperature of 250° C. to 350° C. at the point the fuel/air mixture enters the cylindrical container. The injection point of the fuel/air mixture was preferably toward the end of the container on which the hot surface igniter is mounted.

The hot surface igniter was preferably mounted at the center of the container and coaxial with the container. The hot surface igniter extended a predetermined distance toward the opposite end of the container, and depended upon the size of the container. The hot surface igniter provided ignition energy during cold startup of the premix POX burner. Once the fuel/air mixture was ignited, the hot surface igniter would be turned off, and the heat release from the high reaction temperature resulted in nearly equilibrated partial combustion products that exit the reaction zone through the exit port of the container. In accordance with embodiments of the present invention, the output gas at the exit port of the premix POX burner may be drawn off as a reducing gas of varying strength to function as an anode blanket gas, a safe gas, a startup gas for starting the fuel cell system's internal reformer, and may also be drawn off and oxidized in a second burner, such as a catalytic burner associated with the starting combustor 12 or associated with fuel cell system 10 itself.

Figure 2:
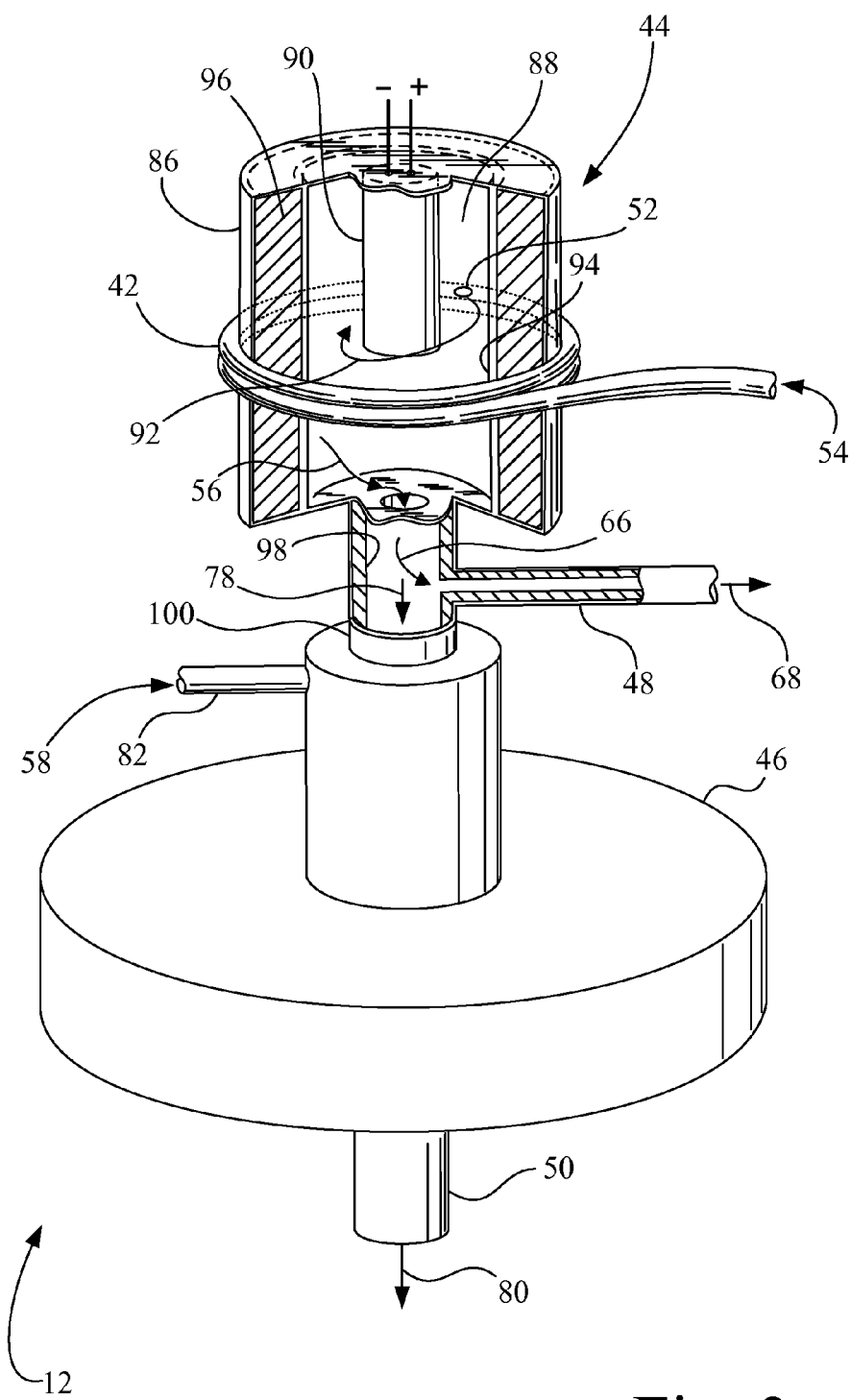
FIG. 2 is a perspective view of a multistage combustor, partially cut away, in accordance with one embodiment of the present invention.

Referring now to FIG. 2, one embodiment of the present invention that generally corresponds to the above-mentioned experimental test version is described. It will be understood by those skilled in the art that the present invention is not limited to the particular structures or connections therebetween as described below. Rather, the physical manifestation described below pertains to only one manner of practicing the present invention, and those skilled in the art would appreciate that other structures and connections may be employed without departing from the scope of the present invention. For example other structures may be employed in order to achieve an aspect of the present invention wherein two combustion stages in series provide two different corresponding output gases that may be employed in starting a fuel cell system such as fuel cell system 10.

The present embodiment of combustor 12 may include premix POX burner 44, first output 48, catalytic burner 46 and second output 50.

Premix POX burner 44 may include a housing 86 having a cylindrical or other suitable shape, a reaction zone 88 defined in housing 86; an igniter 90, such as a hot surface igniter, which may be disposed inside reaction zone 88; and inlet 52, which may be configured to receive a flow of starting fuel/oxidant mixture 54 into reaction zone 88. In a preferred embodiment, the flow of starting fuel/oxidant mixture 54 is pressurized. Alternatively, it is contemplated that in other embodiments, the pressure of fuel/oxidant mixture 54 may be ambient or subambient, and be drawn into combustor 12 via a lower downstream pressure. Inlet 52 may also be configured to induce a swirl 92 into the pressurized flow, e.g., by introducing the pressurized flow in a direction approximately tangential to housing 86. Premix POX burner 44 may be configured to partially oxidize the fuel 28 in fuel/oxidant mixture 54 in reaction zone 88 to yield partially oxidized gas 56.

Combustor 12 may also include preheater 42 in the form of conduit, such as a coil tube, that is configured to preheat and vaporize fuel/oxidant mixture 54 using heat generated in reaction zone 88 during the partial oxidation of fuel 28 (fuel 28 is depicted in FIG. 1), and conducted, convected and radiated therefrom. Preheater 42 may have a length disposed along housing 86 that is configured to limit the formation of carbon deposits around inlet 52 by controlling the maximum temperature of fuel/oxidant mixture 54, e.g., to limit the temperature to approximately that which is sufficiently hot to vaporize the fuel, yet not so high as to induce carbon formation at inlet 52. The actual limiting temperature may vary with the type of fuel 28 that is used.

A liner 94 may be disposed within housing 86 and may define reaction zone 88. An insulating material 96 may be disposed between liner 94 and housing 86. Examples of insulation material 96 that may be resistant to the temperatures achieved in reaction zone 88 include Zircar® Ceramics type AL30 alumina. Examples of insulating liner materials that are resistant to flow induced erosion and to the combustion reaction include silicon carbide materials such as CoorsTek® SIC RB (SC2). Heat from the reaction in reaction zone 88 may be conducted through liner 94, insulating material 96 and housing 86 to preheat and vaporize fuel/oxidant mixture 54. Thus, for a given reaction temperature, the length of the conduit may control the final preheat temperature of fuel/oxidant mixture 54 at the point of injection into reaction zone 88.

First output 48 may be configured to discharge the first amount 66 of partially oxidized gas 56 from premix POX burner 44 as first output gas 68 of combustor 12. The discharge portions of premix POX burner 44, including output 48, may include an insulating material 98 to protect those discharge portions from the high temperatures associated with partially oxidized gas 56. An intermediate output 100 may be configured to discharge the second amount 78 of partially oxidized gas from premix POX burner 44.

Burner 46 may be coupled to intermediate output 100. Burner 46 may be configured to receive the second amount 78 of partially oxidized gas 56 from premix POX burner 44 and to oxidize at least some of the remaining fuel 28 in the second amount 78 of partially oxidized gas 56 to yield second output gas 80 of combustor 12, which is different from first output gas 68, as previously described. Output 50 may be configured to discharge second output gas 80 to fuel cell system 10. Burner 46 may perform the additional oxidation of remaining fuel 28 using secondary oxidant 58 flow that may be received into second inlet 82 as previously described.

Operation of combustor 12 may be achieved by providing power to igniter 90. Once igniter 90 reaches operating temperature, it may create heat and ignition energy sufficient to initiate flame combustion of fuel/oxidant mixture 54, after which point, igniter 90 may be turned off. Once ignition of fuel/oxidant mixture 54 is achieved, the heat release from the high reaction temperature may maintain the combustion of the continuously injected fuel/oxidant mixture 54 and may result in nearly equilibrated partial combustion products. It is contemplated that in some embodiments, depending on the fuel type, an additional preheater may be employed to preheat fuel/oxidant mixture 54 until sufficient heat is received from reaction zone 88 at preheater 42, and to achieve easier more reliable light-off.

Accordingly, combustor 12 may provide a high efficiency, or a low yield of unburned carbon species, which may reduce the environmental impact of fuel cell system 10. Combustor 12 may also provide startup heat to help bring fuel cell system 10 up to operating temperature, and to help bring reformer 20 up to its light-off temperature so that the normal operating exothermic reactions may take place. Combustor 12 may additionally provide startup heat to help heat up vaporizer/mixer 22 in order to cause the vaporization of a liquid form of fuel 28 that may be supplied to vaporizer/mixer 22 at or near the end of startup of fuel cell system 10.

In addition, combustor 12 may provide a reducing blanket gas to protect anode 14 from oxidative conditions, e.g., at temperatures above 300° C. Combustor 12 may also provide a reducing gas to help start up reformer 20 and transition reformer 20 to operation on fuel 28 without detrimental effect.

Further, combustor 12 may provide a safe gas to reduce the likelihood of forming an explosive mixture during startup of fuel cell system 10 in the event of an unexpected leak from fuel cell system 10, which may eliminate the need for bottled compressed inerting gases stored on site for purposes of both protecting anode 14 and of providing a safe gas.

Still further, by providing the partially oxidized gas to reformer 20 during startup, including transition to normal operation, combustor 12 may prevent damage to reformer 20, potentially extending catalyst life and sustaining good catalyst performance of reformer 20.

Figure 3:
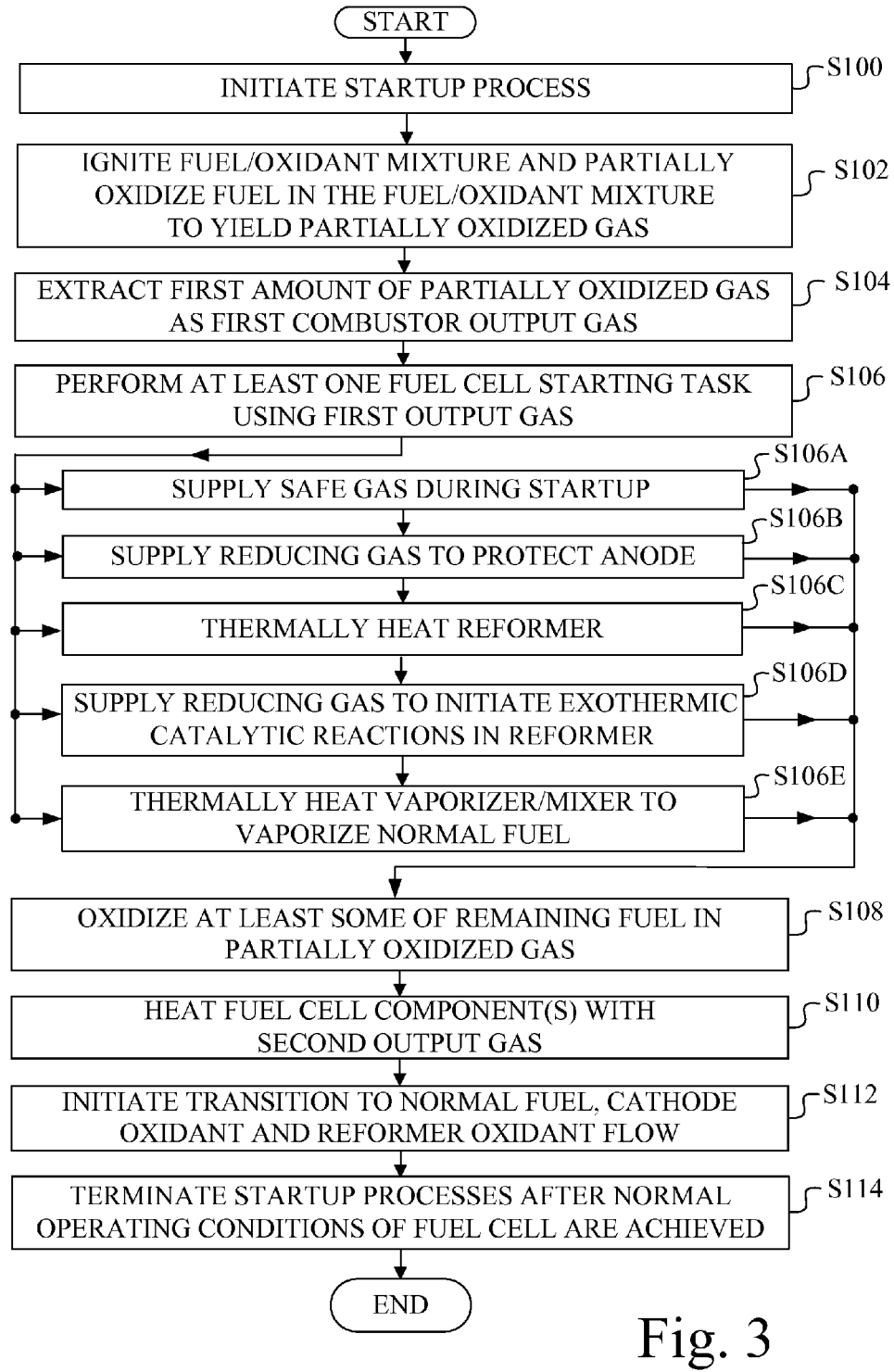
FIG. 3 is a flowchart depicting a method for starting a fuel cell system in accordance with one embodiment of the present invention.

Referring now to FIG. 3, a method for starting a fuel cell system in accordance with one embodiment of the present invention is described with respect to steps S100-S114. It will be understood by those skilled in the art that the present invention is not limited to the particular sequence described below with respect to steps S100-S114. Rather steps S100-S114 represent an exemplary process for purposes of illustration only.

At step S100, a startup process for fuel cell system 10 may be initiated, for example, by supplying power to igniter 90, after which time power may be supplied to blower 60 and pump 36 to begin flowing starting fuel/oxidant mixture 54 to combustor 12.

At step S102, POX burner 44 ignites fuel/oxidant mixture 54, partially oxidizing starting fuel 28 in starting fuel/oxidant mixture 54 in a first combustion process to yield partially oxidized gas 56. In the present embodiment, fuel/oxidant mixture 54 may be substoichiometric, i.e., a fuel/oxidant mixture having insufficient oxidant 58 to yield a complete oxidation of the fuel 28 contained in the mixture, and hence achieving a reaction temperature less than stoichiometric temperature. It will be understood that a fuel/oxidant mixture that is stoichiometric or greater may be employed without departing from the scope of the present invention, for example, by cooling the reaction products or otherwise terminating the reaction prior to complete oxidation.

At step S104, the first amount 66 of partially oxidized gas 56 may be extracted from combustor 12 as a first starting gas product in the form of first output gas 68.

At step S106, at least one fuel cell system starting task may be performed using the first starting gas product. For example, any or all of starting tasks of steps S106A-S106E, described below, may be performed in accordance with embodiments of the present invention. Each of the starting tasks are tasks that may be desired to be performed for purposes of bringing fuel cell system 10 up to normal operating conditions, i.e., the operating conditions that are present during power generation using fuel cell system 10 in supplying power to load EL. In the present embodiment, it will be understood that each of steps S106A-S106E may be performed as part of the startup process for fuel cell system 10.

Generally, the qualities of output gas 68 appropriate for accomplishing a particular starting task may be obtained by adjusting the stoichiometric ratio of starting fuel/oxidant mixture 54 to yield a reducing gas of the required strength and quantity. Thus, where different characteristics of output gas 68 may be desired, depending upon the starting task, those different characteristics may be obtained by adjusting fuel/oxidant mixture 54. In cases where the desired characteristics of output gas 68 may be sufficient to satisfy each of the starting tasks mentioned, steps S106A-S106E may be performed at the same time. In cases where the desired characteristics of output gas 68 for one starting task are different than the desired characteristics for another starting task, those starting tasks may be performed sequentially. For example, in some embodiments, the fuel/oxidant ratio of fuel/oxidant mixture 54 may be adjusted to suit a first such starting task, and then, upon completion of the first such starting task, the ratio may be adjusted to suit the other such starting task.

At step S106A, a starting task may include supplying a safe gas to fuel cell system 10 during the starting of fuel cell system 10. A safe gas is a gas that is nonflammable or weakly flammable in the presence of an oxidant such as air. It may be desirable to employ a safe gas in order to reduce the likelihood of a fire or explosion in or near fuel cell system 10 during the startup of fuel cell system 10. However, once fuel cell system 10 is operating at normal temperatures, a safe gas may not be required, since the operation of fuel cell system 10 may be above auto-ignition temperature, and hence potential hazards may be automatically eliminated because any leaks in fuel cell system 10 may harmlessly auto-ignite in small quantities, rather than building up a large volume of flammable gases that might otherwise result in an explosion.

Accordingly, in order to accomplish step S106A, starting fuel/oxidant mixture 54 and the first combustion process are configured to render partially oxidized gas 56 as a safe gas, by sufficiently oxidizing fuel/oxidant mixture 54 to yield a product that is either not flame combustible or only weakly flame combustible, and thus unlikely to form an explosive mixture when mixed with air. The first starting gas product, i.e., first output gas 68, may thus be configured as a safe gas that is supplied to fuel cell system 10.

At step S106B a starting task may include supplying a reducing gas as a blanket gas to protect anode 14 from oxidation during the starting of fuel cell system 10. A reducing gas is a gas that absorbs reactive oxygen, i.e., $O_2$, from its environment, and hence serves as a blanket gas to protect anode 14 from oxidation that might otherwise occur due to the presence of oxygen, e.g., oxygen diffusing or leaking across electrolyte 18 from cathode 16 during the startup of fuel cell system 10, as well as any oxygen inside anode 14, reformer 20 and vaporizer/mixer 22 prior to commencement of fuel cell system 10 startup.

Accordingly, in order to accomplish step S106B, starting fuel/oxidant mixture 54 and the first combustion process are configured to yield partially oxidized gas 56 as being substantially free of a reactive oxidant ($O_2$), i.e., having only trace amounts of $O_2$, if any, thereby configuring first starting gas product as a reducing gas having a reducing strength sufficient to protect anode 14. The first starting gas product may be then supplied to anode 14, e.g., via vaporizer/mixer 22 and reformer 20. The reducing strength pertains to the propensity for the reducing gas to react with oxygen, and a gas having a greater reducing strength has a greater propensity to react with oxygen than a gas having a lesser reducing strength. The reducing strength is thus a measure of the ability of the gas to protect against oxidation, since the gas reacts with the oxygen instead of the thing sought to be protected, which in the present embodiment may be anode 14. For purposes of step S106(B), the reducing strength of the first starting gas product is selected based on the anticipated need for preventing oxidation, for example, of anode 14.

At step S106C, a starting task may include thermally heating reformer 20 in order to place reformer 20 in thermal condition to perform its normal exothermal catalytic reactions to generate synthesis gas 32 for anode 14. Once the synthesis gas 32 is being created by reformer 20 and delivered to anode 14, the externally provided reducing gas from combustor 12 at step S106B may no longer be required to be supplied to anode 14 as blanket gas, since synthesis gas 32 is a reducing gas, and may thus serve as a blanket gas to protect anode 14 during normal fuel cell system 10 operations. Accordingly, in order to accomplish step S106C, the first starting gas product may be provided to reformer 20 to thermally heat reformer 20, e.g., by convection, conduction and radiation from first output gas 68.

At step S106D, a starting task may include providing a startup reducing gas to initiate exothermic catalytic reactions in reformer 20 for transition to normal reformer operation. Accordingly, in order to accomplish step S106D, starting fuel/oxidant mixture 54 and the first combustion process may be configured to yield partially oxidized gas 56 as being substantially free of a reactive oxidant ($O_2$), i.e., having only trace amounts of $O_2$, if any, to yield a reducing gas.

The reducing strength of partially oxidized gas at step S106D may be greater than that provided at step S106B, and may be configured to simulate the normal reformer fuel/oxidant supplied to reformer 20 during power generating operations, including water vapor, which may initiate exothermic catalytic reactions (ignition) in reformer 20. The first starting gas product may thus be configured for step S106D as a reducing gas having a reducing strength appropriate to yield the chemistry sufficient to initiate catalytic reactions in reformer 20 for transition to normal operation of reformer 20.

At step S106E, a starting task may include providing heat to vaporize the normal fuel 28 employed by fuel cell system 10. Accordingly, in order to accomplish step S106E, the first starting gas product may be supplied to vaporizer/mixer 22, e.g., by convection, conduction and radiation from first output gas 68, to provide heat to vaporizer/mixer 22, so that normal fuel 28 may be vaporized when it is introduced to vaporizer/mixer 22, e.g., at or near the end of the startup process.

At step S108, at least some of the remaining fuel 28 in the second amount 78 of partially oxidized gas 56 may be oxidized in a second combustion process to yield a second starting gas product, i.e., second output gas 80. In the present embodiment, the remaining fuel may be completely oxidized. In addition, in the present embodiment, the oxidation of the remaining fuel 28 may be performed in burner 46. However, it is alternatively considered that in other embodiments, the oxidation of the remaining fuel 28 may be performed in a fuel cell system 10 burner, e.g., a burner, catalytic or noncatalytic, that is part of fuel cell system 10, not part of combustor 12.

At step S110, the second starting gas product, i.e., second output gas 80, may be employed to heat at least one fuel cell system component, e.g., cathode 16 via recuperator 24.

At step S112, a transition to normal reformer fuel 28 flow, normal cathode oxidant 26 flow and normal reformer oxidant 30 flow may be initiated, for example, by ramping up those flows as the temperature of fuel cell system 10 components approaches normal operation conditions, while simultaneously ramping down the flow of fuel 28 and oxidant 58 to combustor 12.

At step S114, upon a determination that fuel cell system 10 components have achieved normal operating conditions, e.g., normal operating conditions at anode 14, cathode 16, electrolyte 18 and reformer 20, the startup processes are terminated, including terminating fuel 28 and oxidant 58 flow to combustor 12.

In view of the above, it is apparent that the present invention pertains to a multistage combustor and/or a multistage combustion processes that may provide multiple combustion products with different levels of oxidation, which may be used for performing multiple fuel cell system starting tasks. Although only two combustion stages are provided in the described embodiments, it will be understood that additional combustion stages may be provided, without departing from the scope of the present invention. By virtue of the present invention, in addition to providing heat to fuel cell system 10 in a general sense, i.e., via second output gas 80, at least five other startup tasks may be achieved, including providing a safe gas to fuel cell system 10 during the starting fuel cell system 10; supplying a reducing gas as a blanket gas to protect anode 14 from oxidation during the starting of fuel cell system 10; thermally heating reformer 20; providing a startup reducing gas to initiate exothermic catalytic reactions in reformer 20, and for transition to normal reformer 20 operation; and providing heat for the vaporization of a liquid fuel normally used by fuel cell system 10. In addition to startup tasks, embodiments of the present invention may also include using combustor 12 to supply first output gas 68 in the form of a reducing blanket gas to protect anode 14 from oxidation during shutdown of fuel cell system 10, e.g., providing blanket gas until the temperature of anode 14 is sufficiently low that oxidation is not a concern. The two-stage combustion process of the present invention may be well suited for a substantially complete conversion of a hydrocarbon fuel in liquid or gaseous form, such as diesel fuel or natural gas to $CO_2$ and $H_2O$, and may yield a relatively clean exhaust gas from combustor 12.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A multistage combustor configured for starting a fuel cell system, said fuel cell system including a first component and a second component, comprising:
   a partial oxidation (POX) burner having an inlet for receiving a flow of a fuel/oxidant mixture, said POX burner being configured to partially oxidize a fuel in said fuel/oxidant mixture to yield a partially oxidized gas;
   a first output coupled to said fuel cell system and configured to provide a first amount of said partially oxidized gas as a first output gas from said multistage combustor to said first component;
   a second burner coupled to said POX burner, said second burner being configured to receive a second amount of said partially oxidized gas from said POX burner and to oxidize at least some of a remaining fuel in said second amount of said partially oxidized gas to yield a second output gas from said multistage combustor different from said first output gas; and
   a second output coupled to said second fuel cell system component and configured to provide said second output gas to said second fuel cell system component.

2. The multistage combustor of claim 1, wherein said POX burner is a premix burner, further comprising a preheater configured to preheat said fuel/oxidant mixture using heat released during the partial oxidation of said fuel in said POX burner.

3. The multistage combustor of claim 1, wherein said POX burner is configured to perform flame burning of said fuel/oxidant mixture, and wherein said second burner is a catalytic burner configured to oxidize said at least some of said remaining fuel using a catalytic combustion process.

4. The multistage combustor of claim 1, further comprising a second inlet coupled to said second burner and configured to supply a secondary oxidant flow to said second burner.

5. The multistage combustor of claim 4, wherein said second burner is configured to completely oxidize said second amount of said partially oxidized gas using said secondary oxidant flow to yield said second output gas.

6. The multistage combustor of claim 5, wherein said second fuel cell system component is a recuperator configured to extract heat from said second output gas for use in said fuel cell system.

7. The multistage combustor of claim 1, wherein said first component is an anode, wherein said fuel cell system further includes at least one of a vaporizer/mixer and a reformer, and wherein said first output provides said first output gas to said anode via said at least one of said vaporizer/mixer and said reformer.

8. The multistage combustor of claim 1, wherein said fuel is at least one of a liquid and a gas.

9. A fuel cell system, comprising:
   an anode;
   a cathode fluidly coupled to a source of a normal cathode oxidant, said cathode being permeable to oxygen ions received from said normal cathode oxidant;
   an electrolyte in communication with said anode and said cathode, said electrolyte being configured to supply said oxygen ions from said cathode to said anode;
   a reformer fluidly coupled to said anode, said reformer being configured to receive a normal operating fuel and a normal reformer oxidant, and to generate a synthesis gas from said normal operating fuel and said normal reformer oxidant for use by said anode;
   a recuperator configured to recapture waste heat for use in said fuel cell system; and
   a multistage combustor configured for starting said fuel cell system, said multistage combustor including:
     a partial oxidation (POX) burner having a first inlet for receiving a flow of a starting fuel/oxidant mixture, said POX burner being configured to partially oxidize a starting fuel in said starting fuel/oxidant mixture to yield a partially oxidized gas;
     a first output coupled to said fuel cell system and configured to provide a first amount of said partially oxidized gas as a first output gas from said multistage combustor to said reformer, said first output gas being configured to start a reaction in said reformer;
     a second burner coupled to said POX burner, said second burner being configured to receive a second amount of said partially oxidized gas from said POX burner and to oxidize at least some of a remaining starting fuel in said second amount of said partially oxidized gas to yield a second output gas from said multistage combustor different from said first output gas; and a second output coupled to said recuperator and configured to provide said second output gas to said recuperator.

10. The fuel cell system of claim 9, wherein said normal operating fuel and said starting fuel are a same fuel.

11. The fuel cell system of claim 9, wherein said starting fuel/oxidant includes said starting fuel and a starting oxidant, and wherein each of said starting oxidant and said cathode oxidant employs the oxygen in air.

12. The fuel cell system of claim 11, wherein said normal reformer oxidant includes the oxygen in air.

13. A combustor for starting a fuel cell system, comprising:

a premix partial oxidation (POX) burner, said premix POX burner having a housing, a reaction zone defined in said housing; an igniter; and an inlet configured to receive a flow of a fuel/oxidant mixture into said reaction zone, said premix POX burner being configured to ignite and partially oxidize a fuel in said fuel/oxidant mixture in said reaction zone to yield a partially oxidized gas;

a first output configured to discharge a first amount of said partially oxidized gas to said fuel cell system from said premix POX burner as a first output gas of said combustor; and a second output configured to discharge a second amount of said partially oxidized gas from said premix POX burner.

14. The combustor of claim 13, further comprising:

a second burner coupled to said second output, said second burner being configured to receive said second amount of said partially oxidized gas from said premix POX burner and to oxidize at least some of a remaining fuel in said second amount of said partially oxidized gas to yield a second output gas of said combustor different from said first output gas; and a third output configured to discharge said second output gas to said fuel cell system.

15. The combustor of claim 13, further comprising a preheater configured to preheat said fuel/oxidant mixture using heat generated in said reaction zone during the partial oxidation of said fuel.

16. The combustor of claim 15, wherein said preheater is a conduit having a length disposed along said housing, and wherein said length is configured to limit a formation of carbon deposits around said inlet.

17. The combustor of claim 15, further comprising a liner disposed within said housing and defining said reaction zone.

18. The combustor of claim 17, further comprising an insulating material disposed between said liner and said housing.

* * * * *